United States Patent [19]

Godbeer

[11] Patent Number: 4,671,877
[45] Date of Patent: Jun. 9, 1987

[54] DEWATERING APPARATUS

[76] Inventor: Barrie C. Godbeer, Willow Farm, Tracy Rd., New London, N.H. 03257

[21] Appl. No.: 737,385

[22] Filed: May 23, 1985

[51] Int. Cl.⁴ .................. B01D 23/24; B01D 39/12
[52] U.S. Cl. ............................ 210/409; 209/274; 209/395; 210/420; 210/433; 210/455
[58] Field of Search ............ 209/264, 268, 277, 274, 209/393, 395, 17, 18, 65, 281; 210/456, 483, 495, 498, 499, 513, 409, 433.1, 420, 455

[56] References Cited

U.S. PATENT DOCUMENTS 2,308,572  1/1943  Symons ............................ 209/393
3,452,876  7/1969  Ginaven .......................... 210/433.1

Primary Examiner—Frank Sever
Attorney, Agent, or Firm—Donald D. Mon

[57] ABSTRACT

Dewatering apparatus having a screen with alternate perforate sections and inperforate accelerator sections, both on a slope. The input feed may be pulsed the better to resist any tendency for the screen to blind.

19 Claims, 11 Drawing Figures

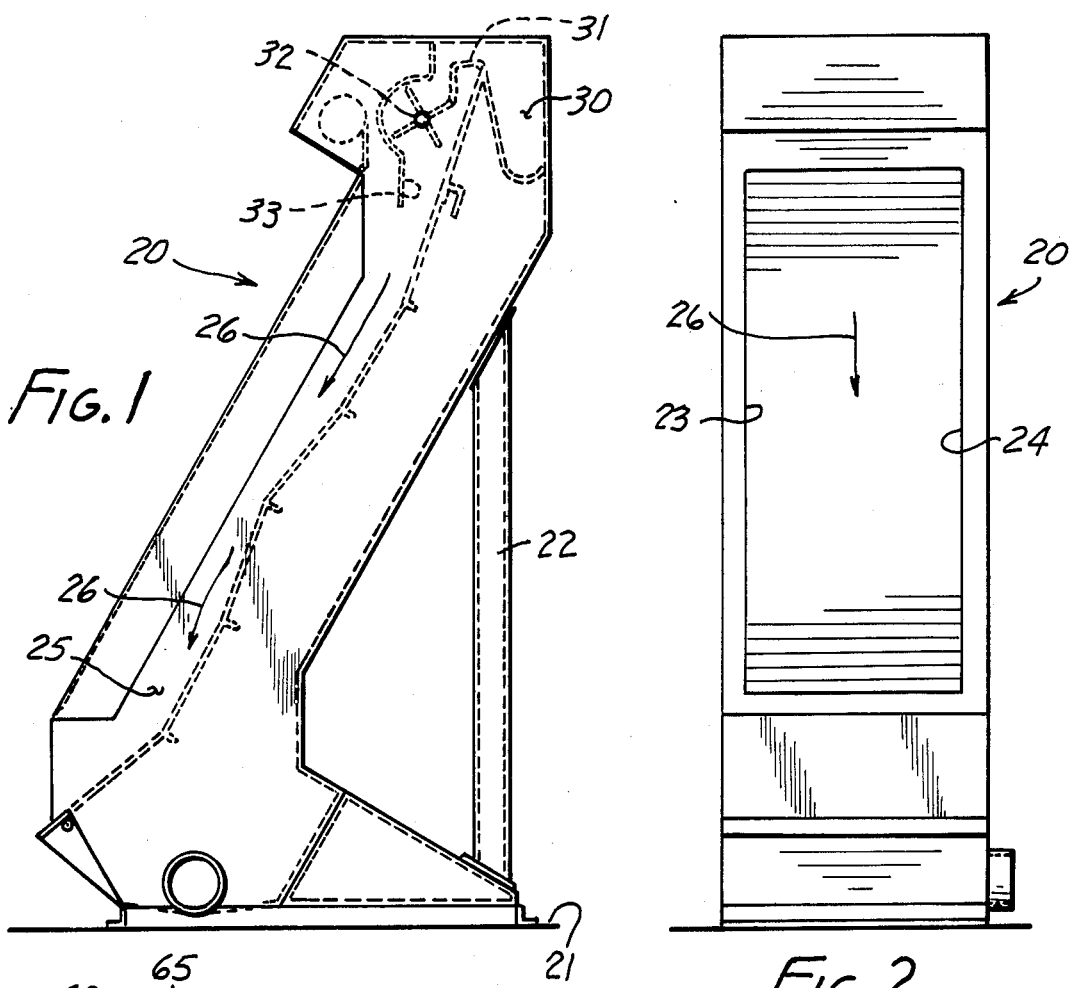

DEWATERING APPARATUS

FIELD OF THE INVENTION

This invention relates to the dewatering of aqueous mixtures.

BACKGROUND OF THE INVENTION

Industry produces many aqueous mixtures from which water must be removed for most effective disposal of its solid content. Sometimes this is accomplished by screening techniques, and indeed this system does utilize some elements that are frequently used in screening operations. However, its specific constructions and mode of operation distinguish it from common screening and thickening operations, and emphasis is therefore placed upon the removal of water or carrier fluid rather than on the separation of the solid as the ultimate objective.

The phrase "aqueous mixture" is utilized to include suspensions, coarse mixtures, colloidal solutions and combinations of these. Their phenomena and their interaction in liquid mediums is very much interdisciplinary in nature both from the point of view of the underlying fundamental principles, and the resultant effect of outside and induced influences upon the solids when they are dispersed in liquid mediums. The resultant phenomena are highly complex and depend upon many chemical, physical and biological factors, including particle size, shape, flexibility or lack of flexibility, the chemical and electrical properties of particle surfaces, interaction of particles with others of both like and unlike nature, and the interaction of the particles with the liquid medium. In addition to these are such effects as the kinetic and electrokinetic properties, and rheological or mechanical properties such as viscosity of a dispersion.

The primary forces involved in the transportation and adhesion of particles in a liquid medium are as follows:

1. Forces and torques relating to the motion of the fluid causing the Brownian motion of particles, which is to say hydrodynamic and diffusion effects.

2. External forces such as those due to electrical, magnetic and gravitational fields including those which are externally induced.

3. Chemical and colloidal forces which result from the interaction of substrate surfaces, particles and molecules in the suspending medium.

Analyses of the separation process have shown that the role of "surface interaction" on the transport of the particle from the bulk of the suspension medium in the vicinity of the substrate or screen surfaces is generally quite small.

In general, liquid suspensions passing along a side hill screen or sieve try to pass through the openings. In so doing they attempt to follow the shortest route as a consequence of gravitational pull. It requires kinetic energy to jump or bridge these screen openings, and such energy is quickly dissipated at the start of the screening surface. A liquid suspension passing through the openings screens out those particulates by size which are larger than the openings. These screened-out solids effectively "blind" or plug the openings as a continuing stream of liquid attempts to pass through it. At a given point there is insufficient surface area of free opening space, and the liquid suspension overrides the blinded area, passing down the surface until it finds an opening it can pass through. Eventually the entire open surface becomes plugged and the entire liquid suspension merely runs over and off the end of the screen.

The liquid suspensions in trying to pass through these restricted openings are subject to the Venturi effect which in turn increases the velocity of the solution as it attempts to make passage. Dependent upon size, shape and depth of openings this acceleration is by degree further accentuated by "Coenda" wall attachment phenomena.

The resultant Venturi effect is to drive and wedge oversize solids into said openings. This is particularly noticeable in the case of suspended/colloidal solids that are soft/semi soft or glutinous in nature. (Example—organic particles vis-a-vis inorganics such as sand.)

Prior screens and sieves rely upon the dissipation of turbulence and kinetic energy within the headbox assembly with a view to establishing smooth laminar flow over a weir or via nozzle(s) onto a flow stabilization initial (non perforate) surface.

The effect (and as claimed by others) creates a continuous smooth laminar sheet of liquid, which by its very nature tends to align suspended solids parallel to the flow stream, before meeting the screening surface.

The result claimed is that the greater length (as in stringy fibrous solids) is presented to screen openings perpendicular to the aperture or slot, thereby allowing for capture of solids which might otherwise (by nature of smaller side—width vs. length) pass through said openings.

Further it is claimed that the smooth laminar sheet of liquid mixture is sheared or peeled off layer by layer as it passes on down the screening surface, until only captured solids exit at the bottom of the sieve.

Each claimant's and/or manufacturer's device has its own design variations, but all utilize the continuous flow, energy dissipating laminar stream for presenting a mixture to a screening surface.

Extensive operating studies by the inventor with a broad range of these devices, has provided insight into why they "plug" or "blind", a complaint which is common across a broad range of industrial and municipal installations. The continuous stabilized laminar flow once it reaches the screening surface, quickly dissipates the entrained kinetic energy in attempting to bridge or jump screen openings. Once this energy is dissipated (usually within the first nine to twelve inches of screening surface) the mixture is subject only to gravitational pull (ie. shortest route) and subsequently tries to pass the entire mixture through substrate openings. This is further accentuated as (noted earlier) by Venturi and wall attachment phenomena present. The Venturi effect imparts hydrodynamic and shear forces upon the mixture, which redefine shape, size and configuration of particulates contained therein. In the case of most soft and semi solids, the induced stresses cause them to break down and pass into solution as finite and dissolved solid. The net effect is that a high percentage of particulates of a size originally larger than the substrate openings, now pass through with carrier fluid! The remaining solids or screened particulates are subjected to the same forces which cause them to compress and wedge themselves within openings.

As the substrate openings are closed off with trapped solids, an interesting phenomena takes place—namely:

Once flow through an aperture is closed off, the stress and compressive forces are reduced, with the result that the trapped solids within substrate apertures or openings actually expand. In doing so they firmly wedge or lock themselves into said openings. The screen openings are now effectively plugged or 'blinded'

This condition is maintained by the continuous flow stream passing over the blinded area creating an encapsulating blanket effect. At a given point there is insufficient surface area of free open space—wherein the liquid suspension overides the blinded area, pass on down the surface, until it can pass through the screen. Eventually the entire open surface becomes plugged, and liquid suspension just runs over and off the end of sieve.

The laminar effect acts much like a classifier, causing particulates and colloidal solids to entrain themselves by specific gravity, weight, size and shape in the various lamina layers.

It is noted that the various layers travel at different speeds, and are effectively isolated from one another. The upper layers travel at higher speeds, with each neighboring layer traveling slower down to the layer that is trying to carry suspended particulates through screen openings with it. The amount of layers is dependent upon thickness depth of liquid medium and the nature of suspended colloidal particulates (see opening paragraphs) and liquid medium.

In the theory the screened solids in the lowest layer next to substrate/screen, slough off and are passed on down the screen surface. The effect being (in theory) to concentrate the solids until they pass off the end of the sieve. In actuality, the layers of liquid passing over the bottom layer tend to bind or encapsulate the captured solids in 'situ' as noted.

The claim that captured solids slough off through friction and reopen screen openings is unsubstantiated in practice. If sloughing does occur, it shears off only those solids above the screen surface, leaving the balance of the solids trapped within screen apertures, encapsulated and firmly in place. Further, said action creates a smooth imperforate surface that further accentuates the "run off" condition so prevolant.

The laminar layer next to the active surface zone, maintains the isolating blanket effect and thereby allows the corresponding layers above to flow on down unhindered.

Once all the open surface area is plugged and encapsulated the screen is effectively blinded—and represents to the liquid a highly lubricated chute or flume. At this point the liquid accelerates (less resistance) and runs right off the end of the sieve.

It has been the study and experience with such screen sieves over the years, that led to the understanding of laminar flow and the effects of same upon screening surfaces (side hill types).

The problems with "blinding, plugging" and "pin feathering" of existing screen types is best reflected in the numerous and often intricate methods manufacturers continue to employ in the attempt to alleviate them. Sprinklers, sprays, washers, and vibrators have all been tried with only limited success. Water sprays/washers force trapped solids through substrate apertures, thereby increasing the solids in filtrate or liquid.

Vibrators create the same effect mechanically, with the induced harmonic loosening the trapped solids so they can pass on through apertures with liquid. Further vibration of the substrate imparts forces which cause many colloidal/finite solids to go into a dissolved state, as mentioned earlier.

Along with the preceeding—and numerous other methods partial effectiveness can be claimed in the constant battle against "blinding", but they also inversely decrease the "solids capture" rate and proportionately reduce the device's efficiency in carrying out the task it was designed for!

An in depth study of this situation has led the inventor to conclude that a fundamental change in approach to dewatering is needed.

The Basic Needs Defined

1. Removal of liquid suspension medium without trapping suspended/colloidal solids in substrate openings.
2. Prevention of layering/laminar effect, and resultant encapsulation of solids in and on perforate substrate.
3. Effect capture of finite colloidal solids within suspension, by minimizing forces that cause them to be dissolved and pass through with separated liquid.
4. Methodology to replace kinetic energy and velocity presently dissipated in bridging perforate substrate.
5. Methodology to continuously remove activated solids from substrate surface.
6. Methodology to effect agglomeration of finite/colloidal solids in a manner that they are released by entraining liquid, and are captured with balance of solids.
7. Methodology to handle continually fluctuating variations in solids both in size/type/nature and percentile relationship to liquid volume.

In this specification, the term "screen" will be used interchangeably to define any surface which presents a substrate along which flow can occur and in which there are openings for the passage of the liquid.

It is important to an understanding of this invention to recognize that the screen or other separation means is not utilized as a separation medium. When operated correctly, increasing or decreasing the size of the openings appears to have little or no effect on the capture (ultimate percentage removal) attained by the device within a wide range of dimensions. It serves only to retire and evacuate separated liquid. This liquid still will of course contain some solids, but for the most part they are finite and colloidal in nature, approaching quite a small micron size and are therefore less affected by certain microscopic effects yet to be described. In fact the actual separation of the solids appears to take place before it reaches the substrate or the screening surface.

BRIEF DESCRIPTION OF THE INVENTION

Dewatering apparatus according to this invention utilizes a support which holds in place a separator with an upwardly facing and sloping surface that defines a flow path from an upper to a lower elevation along which a mixture to be separated is caused to flow. This surface includes at least two perforate sections and one imperforate accelerator section, the accelerator section being located immediately downstream from one said perforate section and immediately upstream from the other. The perforate sections have apertures sized to pass liquid and less than all of the solids, the accelerator sections being smooth and having a lesser coefficient of friction relative to the mixture than the perforate sections. After passing over one of the said perforate sections, the remaining mixture flows upon and along said accelerator section, being accelerated as a consequence of gravity's pull and the lesser coefficient of friction. According to a preferred but optional feature of the invention, the mixture is flowed upon the separator in a pulsating and preferably turbulent flow.

According to yet another preferred but optional feature of the invention, the perforate sections constitute a plurality of parallel rods with an aperture between them forming the perforation, the bars forming an otherwise continuous flow surface.

The above and other features of this invention will be fully understood from the following detailed description and the accompanying drawings in which:

BRIEF DESCRIPTION OF THE DRAWINGS

FIG. 1 is a side elevation of the presently preferred embodiment of the invention;

FIG. 2 is a left hand side elevation of FIG. 1;

FIGS. 3, 4 and 5 are schematic cross sections of various separator configurations;

FIG. 6 is a fragmentary elevation of the presently preferred embodiment of perforate sections;

FIG. 7 is a fragmentary cross section taken at line 7—7 in FIG. 6;

DETAILED DESCRIPTION OF THE INVENTION

Figure 9:
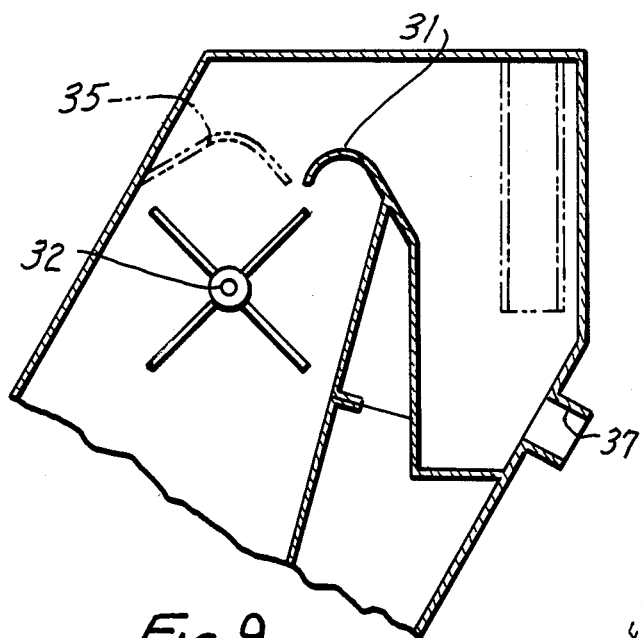
FIGS. 9, 10 and 11 are fragmentary cross sections showing alternate means for presenting a pulsating flow to the separator.

In FIG. 1 there is shown the presently preferred embodiment of dewatering apparatus 20 according to the invention. It is adapted to rest on a floor 21 or a foundation and has a vertical brace 22 to hold it in place. The device has two side plates 23, which together with a separator 24 form a channel 25 along which the mixture to be separated flows along a flow path 26 from top to bottom.

As best shown in FIG. 1, a plenum 30 receives mixture to be separated from a source not shown and is caused to flow over a weir 31 to discharge upon and flow along the surface of the separator. In order to provide for a turbulent and pulsing flow, a chopper wheel 32 is pivotally mounted just below the weir which may have a drag brake (not shown) so that as it turns, the liquid mixture is discharged in successive pulses thereby providing a "pulsed" turbulent flow. A deflector 33 reduces splash. The intended objective is for the flow to be continuously pulsating and turbulent and be discharged along a path generally along, as opposed to generally directed at, the upper surface of the separator.

The separator is adjustably supported in the apparatus so that its various angles can be adjusted to more effectively treat different mixtures, thereby rendering the device more universal in application. Hinged screen sections allow also for entry into rear 'effluent enclosure' and for cleaning/changing screen elements, etc.—as required by the Food and Drug Administration for food applications.

FIG. 9 is an alternate detailed showing of the device of FIG. 1, also showing an optional placement of a deflector 35 which would tend to more directly discharge the mixture onto the chopper wheel. It also illustrates that between deflector 35 and the weir there may be formed a nozzle 36 in the form of a slit which could more forcibly discharge the stream onto the separator. There can also be a row of pressure fed nozzles as an alternate to the slit described.

In fact in FIG. 9, especially if a nozzle 36 is used, the water wheel may be dispensed with and instead a pulsing flow could be caused by pulsating the pressure in the supply line through inlet port 37 such as by means of a typical pulse pump or device. Then flow over the weir and through the nozzle or simple over the weir would be in pulses or in bursts.

Figure 10:
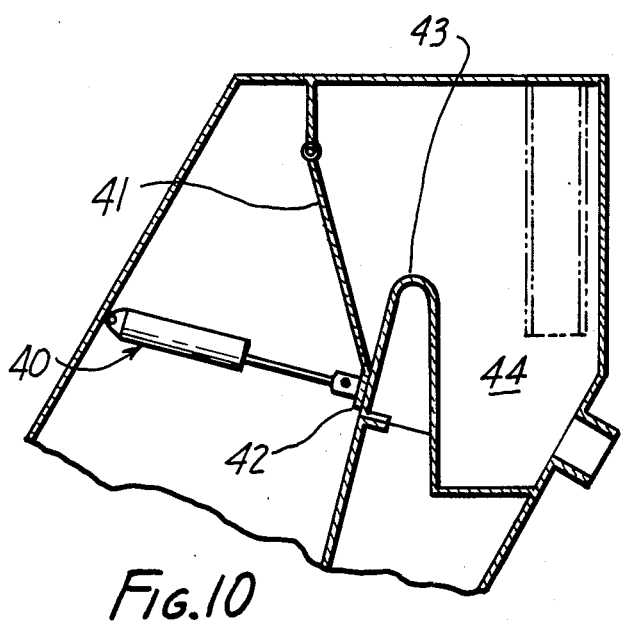

FIG. 10 shows still another means to provide pulsed flow. In this case a spring loaded device 40 in the nature of a spring loaded shock absorber may bear against a pivoted gate 41 whose lower lip 42 is beneath the upper edge of the weir 43. As the level of liquid rises in the plenum 44, finally the resistance of device 40 will be overcome and the gate will open to discharge the liquid at the level above the weir in a pulse. And after it is released, then the device will close the gate.

Figure 11:
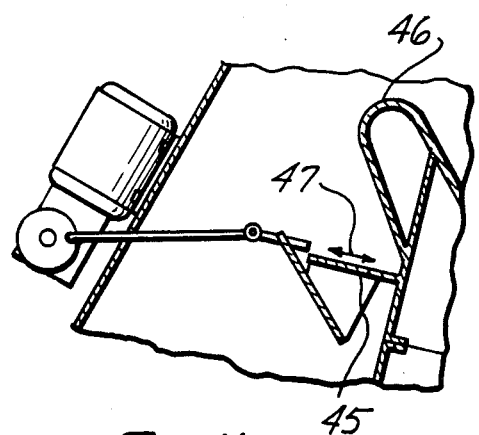

FIG. 11 shows yet another means wherein a gate 45 is placed beneath weir 46 and is cycled between a closed position and an open position as indicated by arrow 47 to release liquid in bursts or pulses. There are merely several examples of means to produce pulsed and preferably turbulent flow onto the separator.

Figure 8:
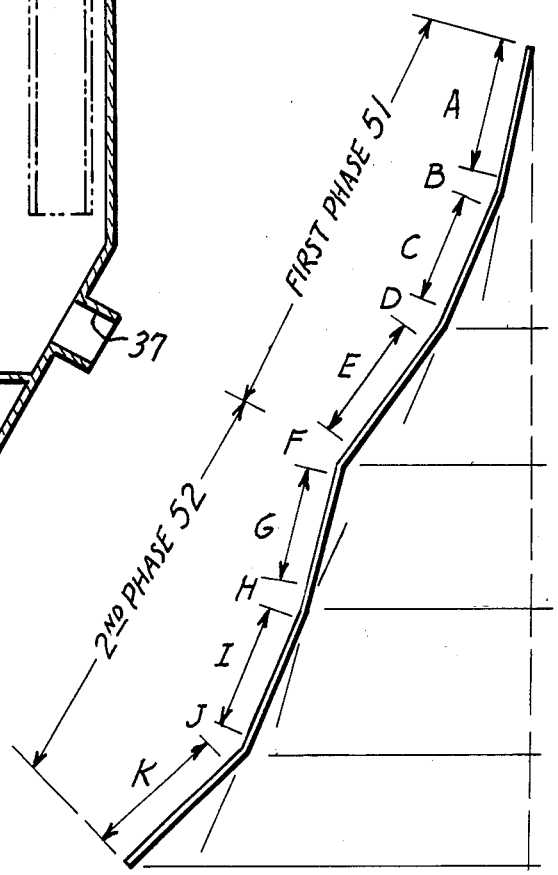
FIG. 8 is a schematic dimensioned diagram of the presently preferred embodiment of the invention.

The presently preferred embodiment of a separator 50 is shown in FIGS. 1 and 8. As best shown in FIG. 8 the separator has a first phase 51 and a second phase 52, phase 51 being the upper one intended for best operation when there is most liquid, and the second phase when there is less liquid and more of the solid proportionately. It will be noted in FIG. 8 that these phases are sometimes at different basic angles relative to the vertical. In the first phase three perforate sections A, C and E are provided at increasing angles to the vertical, interspaced by two imperforate accelerator sections B and D.

Second phase 52 has three perforate sections G, I and K and two imperforate accelerator sections H and J. Between the two phases there is a transition accelerator section F.

All of the accelerator sections are preferably made of smooth material which may be metal, plastic, or an epoxy surface or otherwise for a relatively small coefficient of friction with the mixture which is to flow across it. The perforate sections may be provided in various forms suitable for the separation of the water and solids, and may range from woven fabric to classical rod screens.

The preferred construction is shown in FIGS. 6 and 7 wherein a plurality of rods 60, 61 and 62 are spaced apart by slots (sometimes called perforations) 63 and 64. These perforations preferably extend across the line of flow, although surprisingly in this device they may extend parallel to the line of flow also or at different angles with relation to it and still work well. Furthermore, discrete perforations—circular, square, triangular or otherwise could be formed in a plate instead of providing the structure as rods. However, the rod construction is readily manufactured and highly reliable. Each rod has a flow surface 65 and the flow surfaces (as can best be seen in FIG. 7) all are substantially aligned so that flow of the mixture goes directly across them without encountering much impediment.

The construction shown in FIG. 8 is most convenient. construction shown in FIG. 3 is a simpler one showing alternate perforate and accelerator sections 66 and 67 respectively to provide for a flow at the same angle across a large number of these surfaces. FIG. 4 shows that the construction can be wavy or scalloped, preferably with accelerator sections 70 at nodes so as to give an acceleration to the mixture as it flows down upon the next screen.

FIG. 5 shows a separator 71 which is curved with accelerator and perforate sections 72, 73 respectively forming a single arc instead of a plurality of arcs or segments as shown in FIG. 8.

The size of the perforations will be selectively with regard to the materials to be separated. Different spacings may be desired for separating agricultural wastes than would be required for separating more colloidal wastes such as from an oil refinery. These will be determined empirically, but a single example will be given below.

Both flow surfaces 65 and openings 64 are chosen relative to degree of classification required. 64 is a calcuated open area required to retire a given volume of cleansed liquid. Open area can be achieved either by increasing perforation/slot or increasing total square footage of substrate, or by a combination of both.

Increasing the opening size proportionately increases kinetic drag and dissipation of kinetic energy. The larger the opening, the greater the pressure that must be applied to liquid at the pumping device. Or one can increase the length of initial transitional surface (non perforate) below the weir. Likewise length and/or number of accelerator sections can be increased or decreased.

Needless to say, specific gravity and density of carrier fluid and solids along with percentage relationship of one to other has much bearing as to what openings and substrate angles are used. Likewise—length of perforate and accelerator sections are picked to optimize the separation/dewatering . The same considerations apply to the number of phases to be utilized in any given device.

In operation, the liquid mixture is pumped to the head box without any attempt to dampen, smooth out or quiesce the flow stream as is done with prior screening devices. In fact turbulent or pulsating flow is highly desirable to reduce laminar flow. For this reason the pulse flow pumping device or chopper means as heretofor described will be best but not necessarrily provided. A the liquid goes by with a greater kinetic force because of this pulsation, the solids because of their kinetic energy tend to persist in the direction of flow while the liquid tends to separate because of the gravitational and perhaps of some coanda effect. In brief, the particles appear to be sheared away by their own kinetic forces and do not pass into the perforations where they might plug them. Accordingly the actual separation of the suspended and most colloidal solids occurs before it reaches the screening surface. At this point, after some of the liquid is removed, the solids are concentrated and begin to bind together, a term called agglomeration. This generally occurs in the first phase.

As this mixture passes over the first perforate section, the openings of the separator impart a drag effect absorbing the energy of the separated liquid so that it flows into and through the perforations. Maintaining this velocity is critical to the operation of the invention because otherwise the mixture will slow down, go into laminar flow and then return to the unfavorable action of conventional screens wherein solids are captured by size of opening/aperture with subsequent plugging of openings.

To maintain this velocity, an accelerator section is interspersed between perforate sections so that after the mixture has lost kinetic energy as a consequence of the drag while passing over a perforate section, it acquires it again as it flows over the next accelerator section.

The effect of this speeding up/slowing down motion imparted by alternate sections of perforate and accelerator elements—is to create a pulsing/shunting effect which effectively moves solids down the described surface. This is further accentuated when flow to the device is pulsed or chopped. In watching the device operate, this harmonic pulse effect is most noticeable. The effect has a further important attribute—it prevents agglomerated solids from piling up and creating 'dams'. Freeze frame strobe photography shows that with each pulse or harmonic, the substrate surface area is swept clean. Therefore with each cycle the entire substrate is free and clear for retiring separated liquid. Further, the accumulating agglomerated solids act much like a brush or wiper, which moves the solids down the surface until they drop off the end of device.

The effect is much like that of a vibrator, but whereas others vibrate the structure and screen—this device induces the same motion or harmonic into the liquid itself—the device (structure/substrate) itself remains passive.

The following dimensions have provided a successful device to screen food particles from an aqueous mixture. Dimensions are in inches.

A—18"
B—4"
C—18"
D—4"
E—18"
F—4"
G—18"
H—4"
I—18"
J—4"
K—24"

The various angles may vary from 5 degrees to as much as 40 degrees from vertical. The angle of section K, for example being the greatest. There may be as many as five of these phases.

The perforations are formed by rods, whose spacing apart may be from about 0.002 to about 0.020 inches, 0.10 inches being a suitable spacing.

The pulsation preferably has an off/on reaction between about 50% to 100% of the flow applied. A cycle rate of between about 20 cycles to about 60 cycles per minute, depending on the nature of the mixture, is quite effective. The rate can be as high as 600 cycles, per minute. It can vary from full on to full off, or be undulating "on top" of a substantial flow.

Apparatus according to this invention has operated in side by side tests with a variety of "side hill" screens, sieves and rotary screens which blind with screen slot openings even as large as 0.060 on a given mixture. This device running on the same material with 0.005 to 0.010 openings did not blind or plug. Furthermore, it has operated with perforations as small as 0.002 and 0.004 inches and similarly has failed to blind. In comparison with conventional screens wherein flow capacity (actual not design) and efficiency is highly dependent upon solids percentage within the mixture and percentage of open area to remain unplugged, this new apparatus in fact operates more efficently as the solids loading and flow rate increase. The harmonic pulse effect created by interspersed perforate and accelerator elements, and further enhanced by other means described herein effectively create phenomena wherein the flow is not constant on the surface, but continuously varying from 0 to 100% of design capacity!

Of course the length of flow path depends upon the parameters of the solution which will have to be determined empirically case to case. This invention thereby provides a simple apparatus which is able to separate solids from very large sizes to very small colloidal particulates from an aqueous mixture with little or no blinding, and with surprisingly high efficiency.

This efficiency is well represented by side by side tests wherein the apparatus produced results reflecting often as much as 400% greater capture of solids, higher gallonage per square foot loadings, and no measurable blinding or plugging of apertures.

This invention is not to be limited by the embodiments shown in the drawings and described in the description which are given by way of example and not of limitation, but only in accordance with the scope of the appended claims.

I claim:

1. In screening apparatus for separating solids from mixtures of liquids and solids of the type which includes separating means with an upwardly facing and sloping surface that defines flow path from an upper to a lower elevation, along which a mixture to be separated is caused to flow, said separating means including a perforated screening section having perforations sized to pass liquid and less than all of the solids, the improvement comprising: means for substantially reducing the tendency of said screening section to be blinded comprising: discharge means for discharging said mixture into said separating means; pulsing means for causing said discharge to be pulsational; said separating means includes at least two of said perforate screening sections and one unperforate accelerator section receiving mixture from one perforate section and discharging it onto the next, without barrier type impediment, said accelerator section being smooth and offering less resistance to movement of mixture along said flow path than said perforate screening sections, the mixture remaining after passage along said upstream screening section flowing upon and along said accelerator section, and being accelerated thereon as the consequence of gravitational forces, and said lesser resistance to movement before flowing onto the next perforate screening section.

2. Apparatus according to claim 1 in which said perforations are formed as slots.

3. Apparatus according to claim 2 in which said slots extend laterally relative to said flow path, and in which those portions of said perforate section on each side of said slots are disposed and arranged so that the downstream portion does not rise above the upstream portion in such a way as to impede the flow.

4. Apparatus according to claim 2 in which said slots extend along said flow path.

5. Apparatus according to claim 1 in which said perforations are formed in a continuous said surface, and are bounded by said surface.

6. Apparatus according to claim 1 in which said discharge means is a weir.

7. Apparatus according to claim 6 in which pulsing means causes the rate of discharge over the weir periodically to vary.

8. Apparatus according to claim 7 in which said pulsing means periodically impedes the flow of said mixture.

9. Apparatus according to claim 1 in which said discharge means is a nozzle.

10. Apparatus according to claim 1 in which said pulsing means is a water wheel in the path of the liquid from said discharge means.

11. Apparatus according to claim 1 in which said pulsing means is a gate.

12. Apparatus according to claim 11 in which said gate is opened by weight of a sufficient volume of liquid on it, and closed when insufficient liquid is on it.

13. Apparatus according to claim 11 in which said gate is opened and closed by power means.

14. Apparatus according to claim 1 in which said pulsing means is an air curtain which interrupts or pulses the flow of the mixture.

15. Apparatus according to claim 1 in which said perforations are formed as slots.

16. Apparatus according to claim 15 in which said slots extend laterally relative to said flow path, and in which those portions of said perforate section on each side of said slots are disposed and arranged so that the downstream portion does not rise above the upstream portion in such a way as to impede the flow.

17. Apparatus according to claim 15 in which said slots extend along said flow path.

18. Apparatus according to claim 1 in which said perforations are formed in a continuous said surface, and are bounded by said surface.

19. In screening apparatus for separating solids from mixtures of liquids and solids of the type which includes separating means with an upwardly facing and sloping surface that defines a flow path from an upper to a lower elevation, along which a mixture be separated is caused to flow, said separating means including a perforate screening section having perforations sized to pass liquid and less than all of the solids, the improvement comprising means for substantially reducing the tendency of said screening section to be blinded, comprising said separating means includes at least two of said perforate screening sections and one unperforate accelerator section, said accelerator section receiving mixture from one perforate section and discharging it onto the next without barrier type impediment, said accelerator section being smooth and offering less resistance to movement of mixture along said flow path than said perforate screening sections, the mixture remaining after passage along said upstream screening section flowing upon and along said accelerator section, and being accelerated thereon as the consequence of gravitational forces, and said lesser resistance to movement before flowing onto the next perforated screening section.

* * * * *